Dec. 17, 1935.  H. J. FINDLEY  2,024,440
HEATER
Filed Sept. 7, 1934  2 Sheets-Sheet 1

INVENTOR.
Howard J. Findley.
BY
Slough + Canfield
ATTORNEYS

Dec. 17, 1935.  H. J. FINDLEY  2,024,440
HEATER
Filed Sept. 7, 1934   2 Sheets-Sheet 2
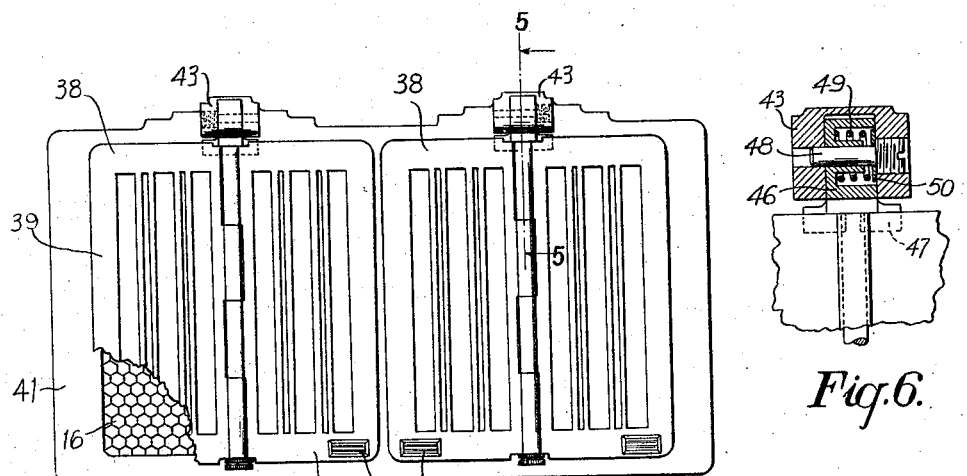
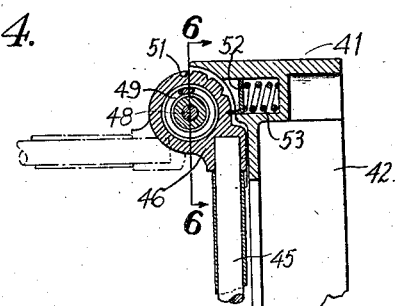
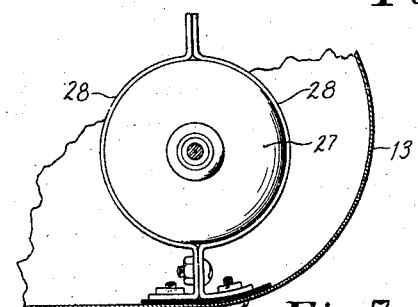
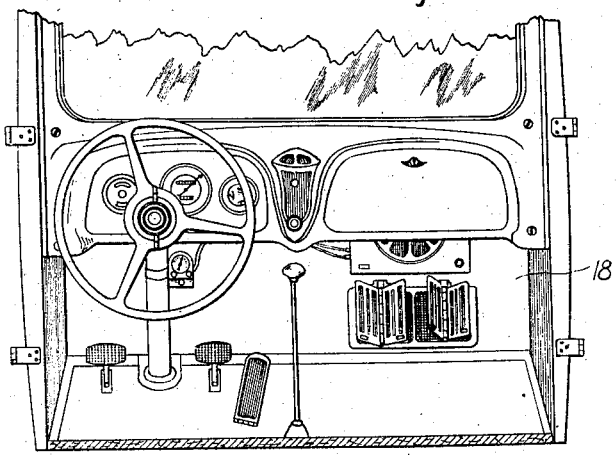
INVENTOR.
Howard J. Findley
BY Slough & Canfield
ATTORNEYS.

Patented Dec. 17, 1935

2,024,440

UNITED STATES PATENT OFFICE 2,024,440

HEATER

Howard J. Findley, Cleveland, Ohio, assignor to The Bishop & Babcock Mfg. Company, Cleveland, Ohio, a corporation of Ohio Application September 7, 1934, Serial No. 743,111

11 Claims. (Cl. 257—137)

My invention relates to automobile heaters and relates particularly to that type of heater for the passenger compartment of automobiles which is adapted to circulate air through the interstices of a hot water or similar radiator by the effect of a power driven fan or blower which fan or blower may be rotated at a high rate of speed by a motor, preferably an electric motor.

Motor operated heaters of this type are well known, but so far as I am aware either are undesirably bulky for proper placement in the restricted space provided for heaters in the modern automobile passenger compartment due to the fact that such automobiles are now made much more compact, the roofs being lower and the instrument board and the space below the instrument board being more constricted especially on the passenger side of the vehicle heretofore providing the proper space for heaters, due to the fact that automobiles are now commonly equipped with glove compartments on said instrument board and radio compartments, or a combination of both.

Such additional equipment and compartments secured to or secured adjacent to the rear of the instrument board on the passenger side of the vehicle passenger compartment leaves a very narrow vertical space between the under surface of the radio equipment or compartment therefor and the upwardly inclined floor board, and where it is desired to install a heater, it is found that prior heaters are too bulky to be properly installed in the small vertical space remaining, this being due to the fact that for their weight and size they are relatively inefficient. Also commonly heaters previously in use are undesirably inefficient with respect to the ability to regulate the direction and amount of the heated air discharged from the heater to the passenger compartment.

An object of my invention therefore is to provide an improved motor operated heater preferably of the electric motor type whose outside over-all dimensions are such as to enable the entire heater to be installed on the passenger side of the passenger compartment of a motor vehicle of the up-to-date low built type, without unduly restricting the leg room afforded the companion passenger riding in such an automobile.

Another object of my invention is to provide an improved means for effecting a ready regulative flow of heated air in any desired quantity within reasonable limits to the passenger compartment of the automobile.

Another object of my invention is to provide an improved heater for passenger automobiles in which the operating parts may be efficiently disposed in an outer casing suitably formed to conform with the space provided for such heater below the instrument board and appurtenances thereto of a passenger automobile.

Another object of my invention is to provide an improved heater of the type described which is more efficient in electrical current consumed to drive the electric motor thereof for a given cubic foot out-put of heated air to the passenger compartment.

Another object of my invention is to provide an improved heater for automobiles and especially improved heater for automobiles of the present day type adapted to carry passengers.

Other objects of my invention and the invention itself will be better understood by reference to the accompanying drawings illustrating an embodiment of my invention.

Referring now to the accompanying drawings:—

Fig. 3 is a fragmentary elevational view of the fire-wall and dashboard of an automotive vehicle showing the preferred mounting of the heater of Figs. 1 and 2;

Fig. 4 is a front elevational view of the heater of Figs. 1 and 2 showing the regulating vanes in closed position;

Fig. 5 is a sectional view taken along the lines 5—5 of Fig. 4;

Fig. 6 is a sectional view taken along the lines 6—6 of Fig. 5.

Fig. 7 is a fragmentary sectional view showing the method of mounting the motor within the heater.

Figure 1:
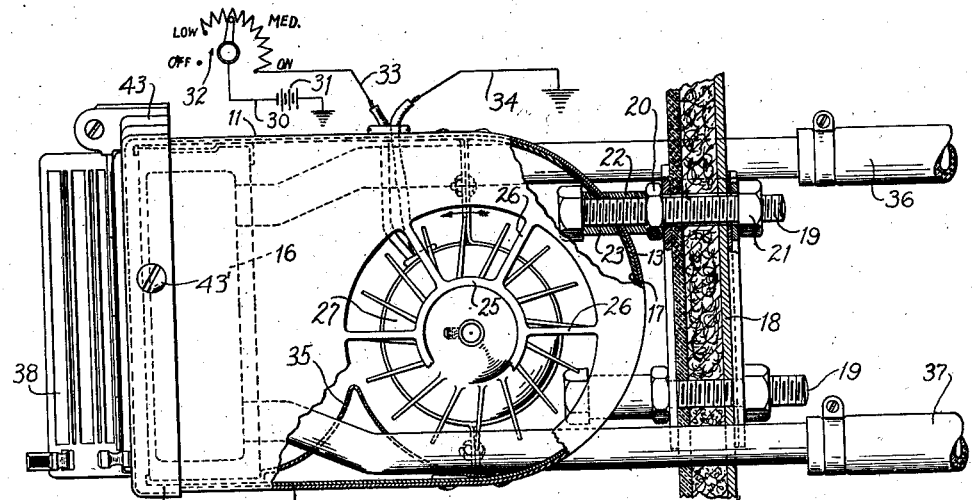
Fig. 1 is a side elevational view, partially fragmentary, of a preferred embodiment of my invention.

Referring to the different figures of drawings, I have indicated the heater casing generally at 10 and preferably formed of sheet metal comprising generally parallel top and bottom walls 11 and 12, respectively, joined by a semi-cylindrical rear wall 13 and end walls 14 and 15. The top, bottom and rear walls are preferably formed as a unit and the end walls secured thereto in any suitable manner such as welding, the front portion of the casing being open for the reception of a heat exchange core generally indicated at 16.

The central portion of the casing is preferably re-inforced by means of an additional U-shaped strip 17 weldingly secured to the central portion of the rear wall 13 and the casing 10 is rigidly secured to the firewall 18 of the automotive vehicle by two vertically spaced bolts 19—19 projected through perforations in the rear wall of the casing and locked to the firewall 18 by bolts 20 and 21. Suitable spacing washers 22 and 23 having their confronting faces conforming to the curvature of the casing rear wall and abutting the inner and outer faces of the same, are tightly secured intermediate the nut 20 and the head of bolt 19.

Thus, a simple and rigid mounting is provided whereby the casing may be easily and quickly secured to the firewall 18.

The casing end walls 14 and 15 are concentrically perforated to provide an annular ring 25 and radially extending ribs 26 having relatively large air entry ports although I contemplate that variously formed air entry ports may be provided.

An electric motor 27 preferably disposed equidistant from each of the casing end walls 14 and 15 is mounted within the casing by means of brackets 28 interconnecting the top and bottom walls of the casing and the motor housing as best illustrated in Fig. 7. Insulating means such as rubber is disposed between the brackets and the casing walls to maintain the casing insulated in the event of a short circuit in the motor. The motor may be of any suitable type operable by a conventional six-volt automobile battery, the motor circuit comprising a lead 30 from a conventional battery 31 to a variable resistance switch 32, thence the lead 33 to the motor and a suitably grounded return lead 34.

The motor shaft is extended on each side of the motor as indicated at 28 and a rotor generally indicated at 29 is rotatably secured thereto by means of a set-screw 31 projected through the rotor hub and engaging a flattened portion of shaft 28.

Figure 2:
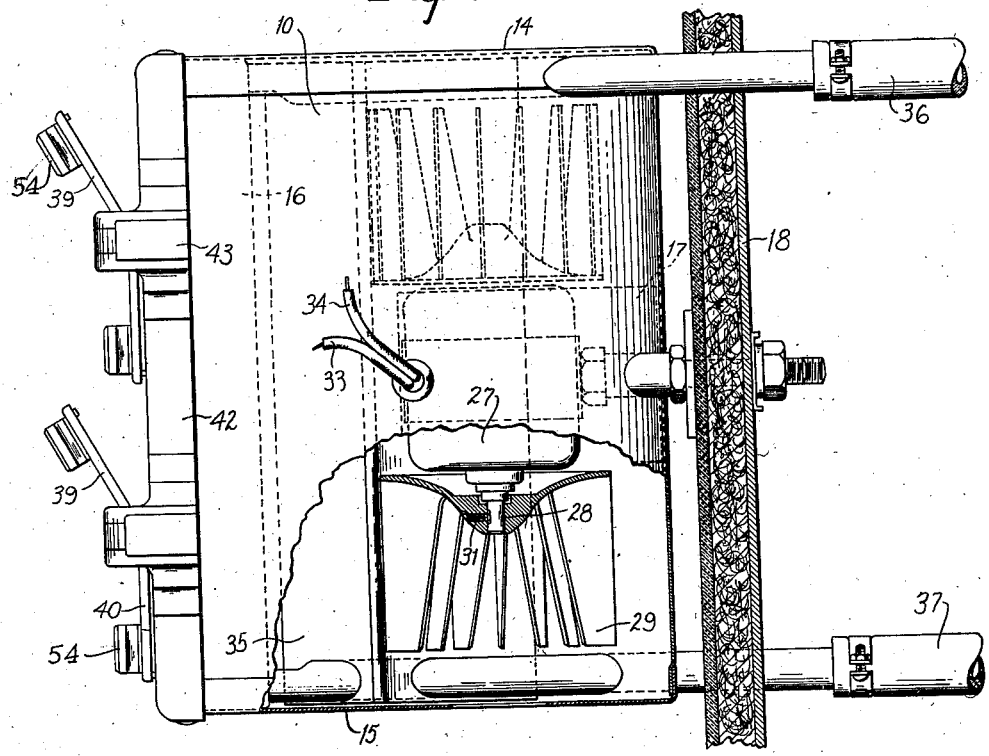
Fig. 2 is a plan view, partially fragmentary, of the embodiment illustrated in Fig. 1.

As best illustrated in Figs. 1 and 2, the rotor blades have their radial outer peripheral portions lying in a common cylinder and the radial inner peripheral portions extend radially and axially outwardly from the rotor hub to provide generally triangular shaped blades, the radial inner blade surfaces forming a frusto-conical shaped air-receiving conduit. As best illustrated in Fig. 1, the blades are also inclined rearwardly relative to the direction of rotation from a radial plane whereby a more efficient propulsion of air is effected.

It will be noted that the axis of the motor 27 is disposed substantially nearer the bottom wall of the casing than the top wall whereby an air conduit of increasing volume is provided intermediate the casing rear wall 13 and the rearward peripheral path of the rotor blades.

Prior to being forced through the radiator core 16, the air drawn inwardly through the laterally disposed casing ports will be forced into a reservoir comprising a space forwardly of the rotor and rearwardly of the radiator core. To prevent this air from being drawn back by the rotor blades prior to being heated, a cut-off generally indicated at 35 is provided, the cut-off comprising a sheet metal plate generally of inverted V-shape extending transversely of the casing and secured thereto in any suitable manner as by welding. The apex of the V or the peak of the cut-off 35 is disposed relatively close to the peripheral path of the rotor blades, and the inner wall of the cut-off is arcuate conforming generally to the said path whereby little if any air prior to being heated will be drawn inwardly between the cut-off and the blades.

The radiator core 16 is disposed at the forward end of the casing and secured therein in any suitable manner as by welding, and may be of any conventional form wherein a closed chamber is provided adapted to have the cooling liquid of the engine forced therethrough, and provided with a plurality of transversely extending tubes forming air passages through the liquid chamber whereby the air will be heated during its passage through the heated tubes. Conduits indicated at 36 and 37 effect passage of the cooling liquid for the vehicle power plant through the chamber of core 16, the upper conduit 36 preferably comprising the incoming conduit and the lower conduit 37 being the return conduit, both conduits at their opposite ends being suitably connected at suitable points in the circulatory system of the engine cooling liquid.

The amount and direction of heated air passing into the passenger compartment of the vehicle is controlled by similar sets of vanes indicated at 38—38, each set comprising a left-hand vane 39 and a right-hand vane 40; and although I have chosen four vanes for purpose of illustration, it is understood that a lesser or greater number may be employed. The vanes are supported by a generally rectangular shaped frame 41 having a rearwardly extending peripheral flange 42 encasing the forward portion of the casing 10. The frame 41 may be removably secured to the casing 10 in any suitable manner as by employing screws 43' projected through the flange 42 and threadedly engaging the casing.

The method of mounting the vanes 39 and 40 is best illustrated in Figs. 4, 5 and 6, and comprises spaced bosses integral with and extending forwardly of the top edge of frame 41, the bosses being indicated at 43. A circular rod 45 is projected through interfitted aligned sleeves provided on the vanes 39 and 40 whereby the rod 45 provides a hinge bearing for the vanes in the usual manner, the rod being pivotally supported at its upper end by means of an enlarged head 46 disposed between the bosses 43. The head 46 may be formed integral with rod 45 or secured thereto in any desired manner, the method shown comprising providing spaced generally rectangular shaped lateral extending ears 47 at the upper end of the rod and having the ears encased by portions of the head 46 during a die-forming operation.

As best illustrated in Fig. 6, the head 46 is recessed to provide a sleeve through which a rod-supporting pin 48 is projected and maintained in a desired position by having the head of the pin threadedly engaging one of the bosses 43, and the recess also forming a housing for a spring 49 and a washer 50 whereby a desired frictional engagement between the head 46 and the bosses 43 may be effected by manipulation of the pin 48.

The aforementioned construction regulating the frictional contact between the head and the bosses disposed on either side thereof, prevents rattling or loosening of the parts and an adjustment means eliminating any such rattle which might develop caused by vibration and the like during normal operation of the car; and additionally, cooperates with means later to be described in maintaining the rod 45 and supported vanes in any regulating position relative to the radiator core such as the position illustrated in dotted lines in Fig. 5.

The primary means permitting the vanes to be moved angularly outwardly relative to the radiator core and maintained in a desired position to control the direction of the heated air emanating from the core are best illustrated in Fig. 5 wherein the rear peripheral portion of the head 46 is provided with a plurality of transversely extending notches as indicated at 51 and adapted to be resiliently engaged by a forwardly extending lip of a sheet metal element 52, the element 52 being constantly urged to an engaged position by a compression spring 53 which is seated in a recess provided in the top wall of the heater frame 41 intermediate the bosses 43. The vanes may thus be angularly disposed relative to the radiator core by manipulating a handle, such as indicated at 54, and the vanes will be locked at predetermined positions determined by the transversely extending grooves 51 and will be maintained in this position partially due to the cooperating frictional force effected between the head 46 and the inner face of the boss 43 due to the spring 49.

The vanes 39 and 40 are hinged about the rod 45 with sufficient frictional contact so that they will remain in a pivoted position about the rod thereby regulating the amount of heated air passing outwardly through the radiator. Thus, referring to Fig. 4, it is obvious that the heating effect may be substantially nullified by having all of the vanes in a closed position as indicated, that the maximum heating effect may be obtained by rotating all of the vanes about the rod 45 to a 90° angle, or that a fourth of the available heat only may be used through opening only one of the four vanes shown.

The compactness of the heater is best illustrated in Fig. 3 wherein the heater is shown mounted on the firewall of a modern automotive vehicle of the low-built type having relatively little room between the base of the dashboard and the inclined floor board and equipped with a radio on the companion passenger side of the vehicle. Due to the increasing tendency toward low-built cars and accessories which are mounted on the dashboard and firewall, it is necessary that a relatively compact and efficient heater be provided for the modern automobile.

Although I have shown and described a preferred embodiment of my invention, I contemplate that numerous and extensive departures may be made therefrom without departing from the spirit of my invention and the scope of the appended claims.

Having thus described my invention, what I claim is:

1. A heater for the passenger compartment of automobiles comprising a horizontally flattened casing, a radiator core disposed within the casing across the front thereof, an electric motor comprising a driving shaft extending laterally of the casing, a blower rotor carried by and adapted to be rotated by said shaft, and means comprising walls of said casing for admitting air to the lateral surface of said rotor and for affording a blower air discharge passage of progressively increased cross-sectional area between the periphery of said rotor and said walls in the form of a spiral for conducting air impelled by said rotor to the approach side of said radiator core, said radiator core affording an outlet for said passage and comprising liquid conduit passages for heated liquid to heat said core, whereby air forced through said core will be heated thereby before discharging into the passenger compartment of the automobile, and a cut-off comprising an element extending transversely of the casing and adjacent a portion of the peripheral path of the rotor and forwardly of the axis thereof minimizing the return of heated air to the rotor.

2. A heater for the passenger compartment of automobiles comprising a horizontally flattened casing, a radiator core disposed within the casing across the front thereof, an electric motor comprising a driving shaft extending laterally of the casing, a blower rotor carried by and adapted to be rotated by said shaft, and means comprising walls of said casing for admitting air to the lateral surface of said rotor and for affording a blower air discharge passage of progressively increased cross-sectional area between the periphery of said rotor and said walls in the form of a spiral for conducting air impelled by said rotor to the approach side of said radiator core, said radiator core affording an outlet for said passage and comprising liquid conduit passages for heated liquid to heat said core, whereby air forced through said core will be heated thereby before discharging into the passenger compartment of the automobile, said casing comprising upper and lower walls and a rear wall, said rear wall being of approximately semi-cylindrical form and joining the other walls at its two ends, and apertured side walls interconnecting each of said other walls and adapted to receive air through their apertures at the intake side of said rotor.

3. A heater for the passenger compartment of automobiles comprising a casing, a radiator core disposed within the casing across the front thereof, an electric motor comprising a driving shaft extending beyond its two ends, said shaft extending laterally of the casing, separate blower rotors carried by and adapted to be rotated each by a different end of said shaft, and means comprising walls of said casing for admitting air to the lateral surfaces of said rotors and for affording a blower conduit passage in the form of a spiral for cold air to the approach side of said radiator core, said radiator core affording an outlet for said passage and comprising liquid conduit passages for heated liquid to heat said core, whereby the air passing through said core will be heated by said liquid before discharging into the passenger compartment of the automobile, and a cut-off comprising an element extending transversely of the casing and adjacent a portion of the peripheral path of the rotor and forwardly thereof minimizing the return of heated air to the rotor.

4. A heater for the passenger compartment of automobiles comprising a casing, a radiator core disposed within the casing across the front thereof, an electric motor comprising a driving shaft extending beyond its two ends, said shaft extending laterally of the casing, separate blower rotors carried by and adapted to be rotated each by a different end of said shaft, means comprising walls of said casing for admitting air to the lateral surfaces of said rotors and for affording a blower conduit passage in the form of a spiral for cold air to the approach side of said radiator core, said radiator core affording an outlet for said passage and comprisng liquid conduit passages for heated liquid to heat said core, whereby the air passing through said core will be heated by said liquid before discharging into the passenger compartment of the automobile, the radially inner edge of said rotor blade diverging axially outwardly to form a generally frusto-conical shaped air intake conduit therebetween and a cut-off element disposed forwardly of the rotor generally conforming to and adjacent a portion of the peripheral path of the rotor and extending transversely of the casing for restricting the return of heated air to the rotor.

5. In a heater for the passenger compartment of an automotive vehicle, a casing having laterally disposed air intake ports and a radiator core for the transmission of heated air to the passenger compartment, means for controlling the amount and direction of heated air passing into the said compartment comprising a plurality of vanes adapted to cover said core preventing the passage of heated air therethrough and individually and hingedly movable, a rod forming a hinging support for each two of said vanes pivotally supported adjacent the top of the radiator core, said rod being adapted to be maintained in a plurality of predetermined angular positions relative to the radiator core by a member resiliently urged to engagement with cooperating means provided in a portion of the rod adjacent the pivotal axis.

6. A heater as described in claim 5 and wherein the rod is pivotally supported between spaced integral portions of the top of the radiator core, and adjustable spring means are provided for varying the frictional contact between the said core portions and the rod portion disposed therebetween.

7. A heater for the passenger compartment of automobiles comprising a horizontally flattened casing, a radiator core disposed within the casing across the front thereof, an electric motor comprising a driving shaft extending laterally of the casing, a blower rotor carried by and adapted to be rotated by said shaft, and means comprising walls of said casing for admitting air to the lateral surface of said rotor and for affording a blower air discharge passage of progressively increased cross-sectional area between the periphery of said rotor and said walls in the form of a spiral for conducting air impelled by said rotor to the approach side of said radiator core, said radiator core affording an outlet for said passage and comprising liquid conduit passages for heated liquid to heat said core, whereby air forced through said core will be heated thereby before discharging into the passenger compartment of the automobile, and means preventing the reentry of air intermediate the rotor and the radiator core to the rotor comprising a cut-off extending transversely of the casing and mounted upon a horizontal wall thereof having an arcuate portion disposed adjacent to and conforming generally to the path of rotor blades.

8. An automobile type heater comprising a generally flattened casing having horizontal top and bottom walls of greater extent than its vertical side walls, and having a perforate heated front wall, and an arcuate rear wall, a side wall thereof having an air inlet opening therethrough, a blower mechanism comprising a motor having a driving shaft and a blower rotor driven by said shaft, said rotor so disposed as to present an axial air receiving end toward said side wall opening and with its periphery disposed closely adjacent to one of said horizontal casing walls and to said rear wall, and being progressively increasingly spaced from said rear wall proceeding from the junction of said rear wall and said horizontal wall along said rear wall to define a substantially scroll shaped air conducting conduit of progressively increased area between said rotor and said horizontal and rear walls.

9. An automobile type heater comprising a generally flattened casing having horizontal top and bottom walls of greater extent than its vertical side walls, and having a perforate heated front wall, and an arcuate rear wall, opposite side walls thereof each having an air inlet opening therethrough, a blower mechanism comprising a motor having a driving shaft and a pair of blower rotors driven by said shaft, said rotors on opposite ends of said shaft and each so disposed as to present an axial air receiving end toward said side wall opening and with its periphery disposed closely adjacent to one of said horizontal casing walls and to said rear wall, and being progressively increasingly spaced from said rear wall proceeding from the junction of said rear wall and said horizontal wall along said rear wall to define a substantially scroll shaped air conducting conduit of progressively increased area between said rotors and said horizontal and rear walls.

10. Vane means for a vehicle heater of the type comprising a casing having a radiator portion adapted to discharge heated air into the vehicle passenger compartment, said vane means comprising a support hingedly secured to the casing by an end thereof and movable angularly outwardly of the radiator portion, and a pair of vanes rotatably secured to the support for variably restricting the flow of heated air from the heater.

11. Vane means for a vehicle heater of the type comprising a casing having a radiator portion adapted to discharge heated air into the vehicle passenger compartment, said vane means adapted to directionally control heated air emanating from the radiator portion and comprising a rod pivotally supported adjacent the top edge of the radiator portion, means for locking said rod in a plurality of angular positions in a plane extending at right angles to the radiator portion, vanes hingedly carried by said rod and adapted to be frictionally maintained in any relative hinging position.

HOWARD J. FINDLEY.